(12) United States Patent
Rodriguez

(10) Patent No.: US 8,498,627 B2
(45) Date of Patent: Jul. 30, 2013

(54) INTUITIVE COMPUTING METHODS AND SYSTEMS

(71) Applicant: Digimarc Corporation, Beaverton, OR (US)

(72) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 13/712,609

(22) Filed: Dec. 12, 2012

(65) Prior Publication Data

US 2013/0122939 A1 May 16, 2013

Related U.S. Application Data

(63) Continuation of application No. 13/614,724, filed on Sep. 13, 2012.

(60) Provisional application No. 61/535,299, filed on Sep. 15, 2011.

(51) Int. Cl.
*H04M 3/42* (2006.01)
*H04M 3/00* (2006.01)
*H04W 24/00* (2009.01)

(52) U.S. Cl.
USPC .................. 455/414.2; 455/414.1; 455/418; 455/456.1

(58) Field of Classification Search
USPC .............. 455/414.1, 414.2, 418, 456.1
See application file for complete search history.

(56) References Cited

U.S. PATENT DOCUMENTS

| | | |
|---|---|---|
| 5,450,490 A | 9/1995 | Jensen et al. |
| 5,550,928 A | 8/1996 | Lu et al. |
| 5,764,763 A | 6/1998 | Jensen et al. |
| 6,122,403 A | 9/2000 | Rhoads |
| 6,512,919 B2 | 1/2003 | Ogasawara |
| 6,614,914 B1 | 9/2003 | Rhoads et al. |
| 6,816,725 B1 * | 11/2004 | Lemke et al. .............. 455/414.1 |
| 6,845,360 B2 | 1/2005 | Jensen et al. |
| 6,862,355 B2 | 3/2005 | Kolessar et al. |
| 6,947,571 B1 | 9/2005 | Rhoads et al. |
| 6,968,564 B1 | 11/2005 | Srinivasan |
| 7,006,555 B1 | 2/2006 | Srinivasan |
| 7,020,304 B2 | 3/2006 | Alattar et al. |
| 7,111,168 B2 | 9/2006 | Lofgren et al. |
| 7,123,740 B2 | 10/2006 | McKinley |
| 7,486,827 B2 | 2/2009 | Kim |

(Continued)

FOREIGN PATENT DOCUMENTS

WO  WO 02/11123 A2  2/2002

OTHER PUBLICATIONS

U.S. Appl. No. 61/432,538, filed Jan. 13, 2011.
U.S. Appl. No. 13/614,724, filed Sep. 13, 2012.

(Continued)

*Primary Examiner* — Wesley Kim
(74) *Attorney, Agent, or Firm* — Digimarc Corporation

(57) ABSTRACT

The present disclosure relates generally to mobile devices and content recognition. One claim recites a method employing a mobile device having a processor configured to perform one or more acts of the method, the mobile device including at least one sensor. The method includes: obtaining information from the sensor; and selecting a user profile from among a plurality of different user profiles based on the information. Other claims and combinations are provided as well.

18 Claims, 3 Drawing Sheets

U.S. PATENT DOCUMENTS

| | | | |
|---|---|---|---|
| 7,696,427 | B2 | 4/2010 | West et al. |
| 7,697,718 | B2 | 4/2010 | Davis et al. |
| 7,769,632 | B2 | 8/2010 | Giraud et al. |
| 7,958,359 | B2 | 6/2011 | Sharma et al. |
| 8,121,618 | B2 | 2/2012 | Rhoads et al. |
| 8,157,748 | B2 | 4/2012 | Briggs et al. |
| 8,165,633 | B2 | 4/2012 | Chang et al. |
| 8,175,617 | B2 | 5/2012 | Rodriguez |
| 8,185,149 | B2 | 5/2012 | Forstall et al. |
| 8,185,155 | B2 | 5/2012 | Chang et al. |
| 8,200,976 | B2 | 6/2012 | Rhoads et al. |
| 8,255,693 | B2 | 8/2012 | Rhoads |
| 8,385,971 | B2 | 2/2013 | Rhoads et al. |
| 8,391,851 | B2 | 3/2013 | Rhoads et al. |
| 8,396,665 | B2 | 3/2013 | Siereveld et al. |
| 2002/0044659 | A1 | 4/2002 | Ohta |
| 2005/0044423 | A1* | 2/2005 | Mellmer et al. ............. 713/201 |
| 2005/0085188 | A1 | 4/2005 | Ishii et al. |
| 2007/0253594 | A1 | 11/2007 | Lu et al. |
| 2008/0076450 | A1 | 3/2008 | Nanda et al. |
| 2008/0317278 | A1 | 12/2008 | Lefebvre et al. |
| 2009/0011740 | A1 | 1/2009 | Aggarwal et al. |
| 2009/0124241 | A1 | 5/2009 | Krishnaswamy et al. |
| 2009/0187593 | A1 | 7/2009 | Chen et al. |
| 2009/0253455 | A1* | 10/2009 | Huang ........................ 455/550.1 |
| 2010/0016014 | A1* | 1/2010 | White ........................ 455/556.1 |
| 2010/0082487 | A1 | 4/2010 | Nelsen ............................. 705/44 |
| 2011/0161076 | A1 | 6/2011 | Davis et al. |
| 2011/0205053 | A1 | 8/2011 | Chen et al. |
| 2011/0207440 | A1 | 8/2011 | Ruuspakka et al. |
| 2011/0300875 | A1* | 12/2011 | Kim et al. .................. 455/456.1 |
| 2012/0052872 | A1* | 3/2012 | Do .............................. 455/456.1 |
| 2012/0157114 | A1* | 6/2012 | Alameh et al. ............. 455/456.1 |
| 2012/0185419 | A1 | 7/2012 | Kuhn et al. |
| 2013/0054690 | A1* | 2/2013 | Wei et al. ...................... 709/204 |

OTHER PUBLICATIONS

U.S. Appl. No. 61/535,299, filed Sep. 15, 2011.

* cited by examiner

INTUITIVE COMPUTING METHODS AND SYSTEMS

RELATED APPLICATION DATA

This application is a continuation of U.S. patent application Ser. No. 13/614,724, filed Sep. 13, 2012, which claims the benefit of U.S. Provisional Patent Application No. 61/535,299, filed Sep. 15, 2011. This application is generally related to U.S. patent application Ser. No. 12/797,503, filed Jun. 9, 2010, published as US 2011-0161076 A1. The disclosures of the above patent documents are each incorporated herein by reference, in their entireties.

TECHNICAL FIELD

The present specification concerns a variety of technologies; some concern enabling mobile devices (e.g., smart phones and other devices) to identify content and make intelligent inferences regarding the same.

DETAILED DESCRIPTION

Figure 1:
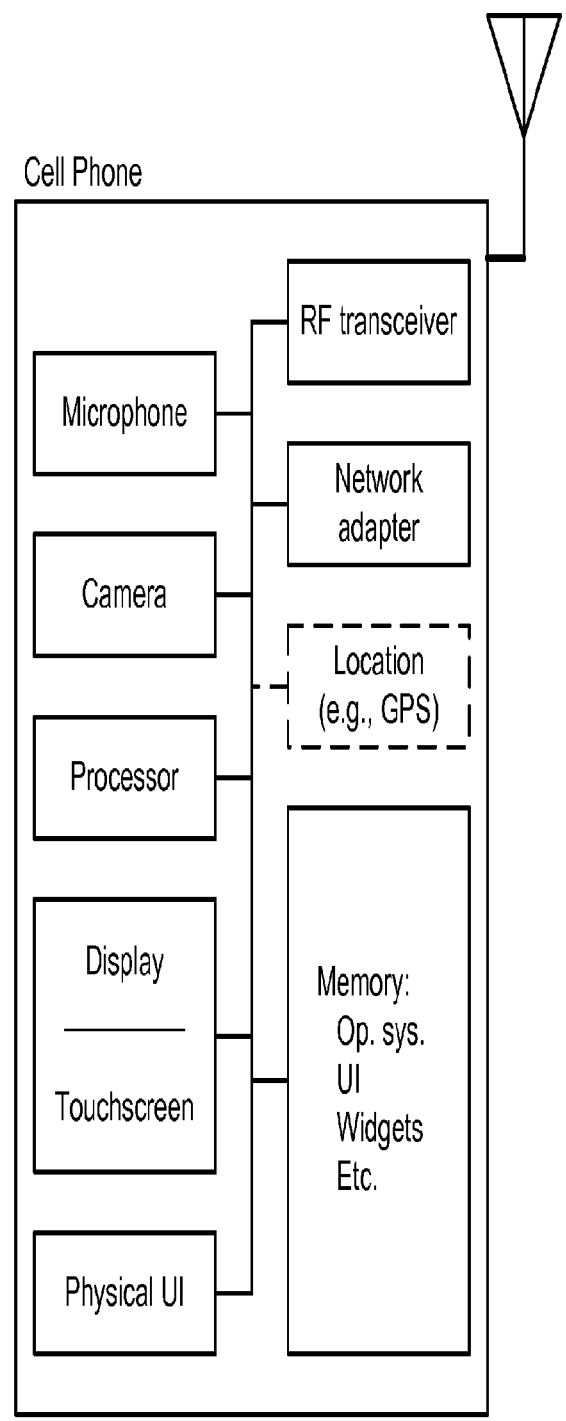
FIG. 1 is a block diagram corresponding to a mobile device.

Cell phones have evolved from single purpose communication tools, to multi-function computer platforms. "There's an app for that" is a familiar refrain.

Over six hundred thousand applications are available for smart phones—offering an overwhelming variety of services. However, each of these services must be expressly identified and launched by the user. This is a far cry from the vision of ubiquitous computing, dating back over twenty years, in which computers demand less of our attention, rather than more. A truly "smart" phone would be one that takes actions—autonomously—to fulfill inferred or anticipated user desires.

One company, Bump Technologies (referred to here as "Bump," with a capital B), seeks to use mobile phones to exchange contact data and other information. In Bump's model, two mobiles physically (or simulate) bump each other to initiate the exchange. Generally, there are two parts to the bump process: the app running on two mobile devices and a matching algorithm running on the Bump servers in the cloud. The app uses the phone's sensors to literally "feel" the bump, and it sends that information to the Bump servers. The matching algorithm listens to the bumps from phones around the world and pairs up phones that felt the same bump. Then Bump routes information between the two phones in each pair. Bump uses various techniques to limit the pool of potential matches, including location information and characteristics of the bump event. If bumping occurs in a particularly dense area (e.g., at a conference), and it cannot resolve a unique match after a single bump, Bump may ask for an additional bump. Bump uses location information as one of the ways to limit the number of other phones checked to determine the correct match. Basically, if a phone is in Chicago, such location info is used so that bump need not be compared with bumps coming in from Japan, Europe, New York, etc. For this reason, Bump may require that location services be turned on and that users authorize the use of their location information. If a user wants to restrict information, they can "un-check" information on a user interface. This limits the information that is transferred via the bump.

Digimarc Corp., the assignee of the present application, owns U.S. Pat. No. 7,123,740, which is incorporated herein by reference, in its entirety. The '740 patent describes how a PDA screen can show an image such as a picture of the PDA's owner. The picture can be digitally watermarked to serve as a business card. This picture can be beamed to an associate's device (e.g., PDA) at conferences, for example. The associate images the picture (or digitally submits to a watermark reader) and links directly to picture provider's contact page or similar destination for sales, etc.

I have improvements and alternative implementations to transfer contact and other information and data, including providing different user profiles according to environment or need. For example, transfer of different user profiles can be streamlined, perhaps with selection of a different profile being unnoticed to another party.

A user profile preferably includes information associated with a user, such as name, contact information, links, etc. The format of a user profile (e.g., HTLM, XML, vCard, etc.) is less important than the underlining information. And, a user will benefit from multiple different user profiles. For example, I may have a first user profile for use when transferring contact information to a friend. This "friend user profile" may include more personal information, information I wish to be somewhat restricted like home phone and address, personal email account, family pictures, IP address to my family blog, social media account information (e.g., Facebook, Twitter, etc.), etc. I also may have a business profile, a more professional slice of information like professional credentials, Linked-in account information, work phone and email, company information, etc. And, I may have a retail profile, which could include information to facilitate a transaction like credit card information, bank account, shipping address, preferred online retailer, shipping method preference, etc. (Of course there could be a number of different profiles, each including different or overlapping information.)

A user can enter information for different profiles, e.g., via an app running on a mobile device or via an internet website. The user preferably designates or names each user profile for use in a particular occasion (e.g., a "friend user profile" or a "business user profile," etc.). Profiles can be indexed or associated with a content identifier. For example, a first profile may be associated with a first content identifier and a second profile may be associated with a second content identifier, and so on.

One way to control transfer of different user profiles utilizes different content identifiers provided in different situations. Take, for example, two mobile devices: a first device and a second device. FIG. 1 shows an exemplary mobile device including, e.g., elements such as a microphone, an optical sensor (e.g., an image and/or video camera), a processor, a display/touchscreen, a physical user interface, a RF transceiver, location module (e.g., GPS), network adaptor and memory. The memory may store operating system software, user interface software (e.g., an "app" to manage and transfer user profiles), content recognition software, other functional software modules, etc. Of course, mobile devices may include more or less features and will also benefit from the present disclosure. (Implementation, of course, can be on a single processor system, or a multi-processor system. In the future, different processors or "cores" of a multi-processor system may be assigned to perform different of the tasks.)

Both mobile devices can be running an app (or other software application) to help control the exchange of user profiles. The app may provide a user interface(s) to help guide the exchange.

The first device wishes to transfer information (e.g., a user profile) to the second device. The first mobile device's display screen may include a background image or other graphic. The second device includes an optical sensor, e.g., an image and/or video camera. The second device's camera captures optical data representing the first device's display. This action initiates transfer of a user profile, e.g., my friend user profile.

The second device may be equipped with a content recognizer (e.g., the app may include such or call such). The content recognizer generates a content identifier for the image content (e.g., from the background or graphic displayed on the first mobile device's display). This content identifier can be forwarded to a remote database, e.g., hosted in the cloud, in which is stored previously populated user profiles. In one implementation, the content identifier is used to index a database to find particular user profile associated with the first mobile device or with a user of the first mobile device. A corresponding user profile can be forwarded to the requesting mobile device, or can be associated (e.g., in the cloud) with an account associated with the second mobile device.

Content identification can take different forms. In one form, digital watermarking is used. The first device's background or graphic may include a digital watermark hidden therein. A watermark may include a plurality of components. For example, one component may carry a message (or payload), while another component may serve to identify the orientation of the message in a combined signal. The orientation component may provide information such as rotation, scale and translation of the watermark message. Typically, a watermark detector looks for a watermark signal in a potentially distorted version (e.g., skewed or disoriented with respect to an original orientation) of the combined watermark signal, and computes its orientation, sometimes relative to the expected original orientation of the watermark signal.

A watermark payload can be decoded by the second device and forwarded to the remote database. The payload can be used to locate a user profile. (In another embodiment, the second device forwards image data, perhaps filtered, to the remote database or other remote location. The image data is processed remotely from the second mobile device to decode the digital watermark.) Technology for encoding/decoding watermarks is detailed, e.g., in Digimarc's U.S. Pat. Nos. 6,614,914 and 6,122,403; in Nielsen's U.S. Pat. Nos. 6,968, 564 and 7,006,555; and in Arbitron's U.S. Pat. Nos. 5,450, 490, 5,764,763, 6,862,355, and 6,845,360. The disclosures of these patents are incorporated herein by reference, in their entireties, along with Digimarc's U.S. Pat. Nos. 7,958,359 and 6,947,571.

Another form of content identification utilizes so-called "fingerprinting." Fingerprinting derives or extracts a unique identifier from a content item itself. For example, perceptual features are statistically or mathematically characterized, and such characterizations are used as a content identifier. Once a content identifier has been computed it can be used by the second mobile device to obtain a profile. Examples of image/video fingerprinting are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC). The disclosures of these patents are incorporated herein by reference, in their entireties.

So, a displayed image or graphic, once optically captured, can trigger provision of a user profile. But I want more. I want to communicate different user profiles for different settings or experiences. After all, I might not want a business colleague to have access to my personal user profile or friend user profile.

One way to accomplish transfer of different user profiles is through conveying different orientation information. For example, orientation information can be conveyed through different positioning (e.g., different orientations) of a device display screen when it is photographed. I can hold the mobile device a first way (see FIG. 2A) when I want to transfer a first profile, hold the device a second way (see FIG. 2B) when I want to transfer a second profile, and hold the device a third way (see FIG. 2C) to facilitate the transfer of a third profile, and so on.

Recall from above that a watermark may include a component from which orientation information can be determined. So, for example, if my background or other displayed image/graphic includes a digital watermark with an orientation component, holding the displayed, watermarked background at different orientations will introduce different orientation information when the digital watermark is decoded. (Beforehand, I can associate different orientations or orientation ranges with different profiles when I register a particular watermark or particular watermarked background. For example, I can do this, e.g., with an app running on my mobile device, or through an online portal that manages my different profiles as discussed above.)

Figure 2A:
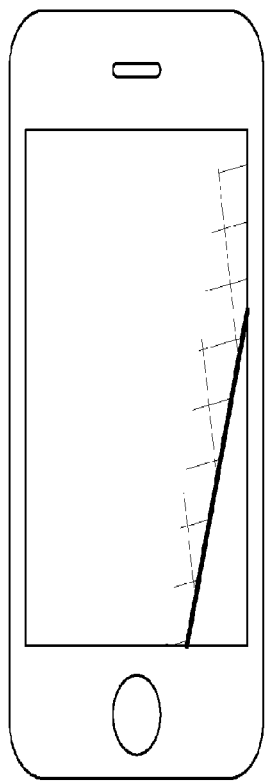
FIG. 2A shows a mobile device display screen held in a first position.
Figure 2B:
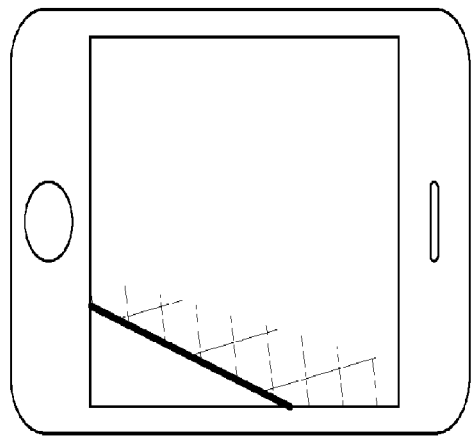
FIG. 2B shows a mobile device display screen held in a second position.
Figure 2C:
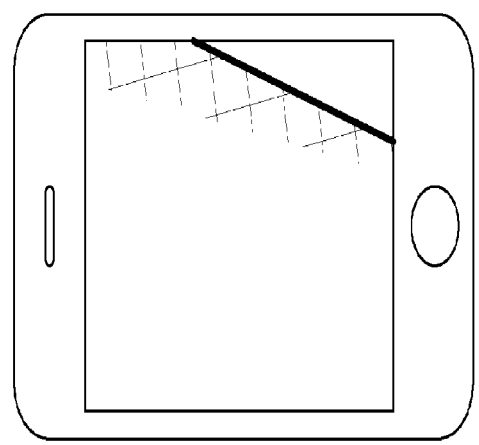
FIG. 2C shows a mobile device display screen held in a third position.

A tolerance can be included so that minor orientation variations during imaging do not change my intended profile selection. For example, the rotation in FIG. 2A is near 0 degrees. The first profile can be associated within ±30 degrees of 0 degrees. The rotation in FIG. 2B is near 90 degrees, and the second profile can be associated within ±30 of 90 degrees. The rotation in FIG. 2C is near 270 degrees, and the third profile can be associated within ±30 degrees of 270 degrees. (Of course, 0, 90 and 270 degrees, along with the ±30 degree range, are used by way of example. Other orientations and ranges can be selected.)

Let's explore this further. Say I encounter a friend at while kicking the soccer ball with my kids at the park. We haven't seen each other for a while so I want to update my friend my most recent digits (e.g., my up-to-date friend user profile). I've previously set my background (or other image) on my mobile phone to include a digital watermark, and I've associated my "friend profile" with a certain orientation (e.g., 0 degrees, with some allowable tolerance). I hold my mobile device up and my friend takes an image or video of my display screen, capturing my watermarked background or other image. The watermark is decoded to obtain a payload, and the watermark orientation information is determined. Both the payload and the watermark orientation information are conveyed to a remote database. There, the watermark and orientation information are used to find my "friend user profile," which can be provided to my friend's device, or made available for their access (e.g., stored in the cloud). In one implementation, the watermark can be used to access a database, record or table associated with me or my mobile device. The watermark orientation information can be then used to locate a particular user profile within the database, record or table.

If I later encounter a potential business client, I can hold my phone at a different orientation before image capture. (I've previously associated the different orientation (e.g., 90 degrees rotation) with my "business profile".) This will allow transfer of my business profile through the same decoded watermark payload but with different watermark orientation information.

While the above examples discuss rotation-based orientation the disclosure is not so limited. Indeed, a display screen can be held at other orientations to include perspective, translation, scale, etc. This information can be used to further refine selection of a particular user profile.

Instead of using different orientations, different images can be used to convey or select different user profiles. For example, a first image can be associated with a first user profile, a second image can be associated with a second user profile, and so on. When encountering a friend, retailer or business client, I can quickly present the appropriate image and let them capture such with their mobile devices camera. If I have a touchscreen, I can merely "swipe" the screen to find the right picture. (An app can be configured to present images for display, or my default background screen—probably through the device operating system—can be configured to allow swiping to different images.) Each image may have a unique content identifier associated therewith (e.g., an encoded digital watermark or registered fingerprint). Once decoded or derived, the content identifier can be forwarded to a database for identification, and the person can have access to one or more of my particular user profiles.

My different images can have semantic value to help me remember which image should be displayed. For example, an image associated with my friend user profile may depict me with a group of friends; or, an image associated with my business profile may depict my company logo or me all cleaned up in a suit and tie. My retailer profile might include a depiction of a bank or check, and so on.

Instead of using completely different pictures, I can use subtle variations of the same picture, each with a different watermark payload embedded therein or with a registered fingerprint of each. That way I can conceal which profile I am providing someone. For example, a first variation might include a slightly cropped version of a base image, or may include a few blacked out or altered pixels, or may include a different brightness or color variation. The different content identifiers can be associated with different profiles. This may help prevent a third party from distinguishing which profile I am allowing access.

Another example includes placing a finger or thumb over the display. The finger or thumb is captured along with the displayed image or background. Pattern recognition can be employed to recognize the thumb or finger. This would not necessarily have any meaning to the person taking the picture, but I could have this preprogrammed (via a registration process) to help select a user profile. For example, perhaps I only cover the display with a thumb when presenting to a person of dubious character. The recognized thumb is used to select a "stripped-down" user profile, one that only includes the barest of public information (e.g., name and work phone).

In some cases, the mobile device can decide which profile should be presented. For example, time, location and calendar information can be used to automatically determine which profile should be presented. Mobile devices often include a GPS or other location means. A mobile device could then use current location information from the GPS or other location mean, perhaps in conjunction with an online service (e.g., Google Maps), to determine which user profile to select. For example, if the current location information indicates that I'm in a Sporting Goods store the retailer profile can be selected (e.g., via a displayed image having a content identifier associated with my retailer profile). Or, if my current location is in an office park, then my business profile can be selected (e.g., via a displayed image having a content identifier associated with my business profile). Still further, if I'm currently at the pub, then perhaps my friends profile is selected by my mobile device (or an app running on the mobile device). In an alternative arrangement, if the location information provides ambiguous results, an app running on the device can present two or more likely user profiles for my selection.

Time can also aid selection of an appropriate profile. For example, if it's after 6 pm, my default profile may become my friend user profile. Or, an electronic calendar hosted online or on my device may be consulted to see if I'm scheduled to be with friends, be at work, meeting new clients, etc. This information can be used to select a user profile.

Some phones also include sensors (e.g., an accelerometer and microphone) which can provide relevant information. Different inferences can be made if the sensor data meets certain criteria. For example, if a sensor indicates the device is traveling at 400 mph, it's likely that I'm on an airplane. A profile can be selected based on this information. Or, if the microphone is hearing certain types of noise or music (e.g., loud music may indicate that I'm busting moves at a night club, etc.) then an inference can be made to select a predetermined user profile. Noise and music characterization techniques have been used, e.g., to select related music for purchase. For example, my music library may be analyzed to determine other music of the same or related genres that I might enjoy. Similar techniques, along with signal amplitude (e.g., volume) can be used to analyze noise or sounds heard by a mobile device to help select a user profile.

Although much better than even 5 years ago, cell coverage (or wireless access) isn't a guarantee. A mobile device can be programmed (e.g., running an app) to store information when cell or network service is unavailable. Watermarks/fingerprints can be queued up and processed once cell/wireless coverage is restored.

Various safeguards can be used to help protect against unauthorized access to a user profile. For example, a user of a second mobile device may be tempted to store image data captured from a first mobile device's display screen. This user may then post the image data on a blog for all to use. Or an unscrupulous retailer may retain an image captured from a customer's display screen in hopes of scoring multiple sales.

One safeguard utilizes the techniques disclosure in Digimarc's U.S. Pat. No. 7,111,168, which is incorporated herein by reference, in its entirety. For example, a hash of captured imagery is obtained, passed to the user profile repository for comparison with other image hashes previously obtained. The presence of the hash in the database may indicate an attack.

Figure 3:
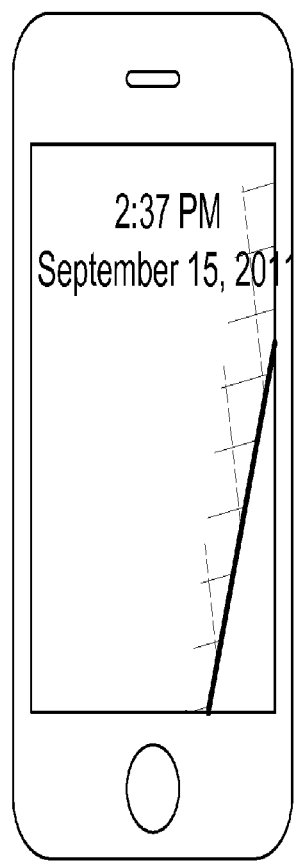
FIG. 3 shows a mobile device display screen displaying a time indicator graphic.

Another safeguard utilizes time information. For example, a displayed image can include a time indicator graphic (2:37 PM, Sep. 15, 2011). See FIG. 3. The time indicator is captured along with the image. Optical Character Recognition (OCR) software can be used to recognize the time. This information can be used to limit access to a user profile. For example, if the time indicator is not within 1 minute (or 15 seconds, or 15 minutes, etc.) of a request for a user profile, then access is denied. A watermark can also include a time/date stamp. The time/date stamp can be used to determine whether the request is fresh enough to allow access, or for comparison against the time indicator graphic.

Digital signatures can also be used as a safeguard. Additionally, traditional challenge and response techniques (e.g., akin to one-time pads) can also be used to help safeguard such exchanges. A digital watermarking embedding process may be altered based upon some predetermined timing arrangement. This altered embedding process can be used each time an image is to be displayed on the screen, introducing a new watermark (or payload) for each user profile exchange. The mobile device and the online user profile repository can be synced so that they correspond. The watermark will only be good for a predetermined time, or for a limited number of user profile access requests.

The present disclosure is not limited to capturing images displayed on a mobile device's display screen. For example, instead of displaying a digital still image, a first mobile device could render a video clip. A second mobile device could capture imagery from the video clip and decode or derive a content identifier from such. That content identifier could then be used to obtain a user profile associated with a user of the first mobile device.

Likewise, audio could be used to transfer different user profiles. A first audio clip (or first audio associated with video) may be associated with a first user profile, a second audio clip (or second audio associated with video) could be associated with a second user profile, and so on. Thus, the present disclosure is not limited to content identifier obtained from still imagery, and the methods and apparatus discussed above could be used with video and/or audio as well.

To provide a comprehensive disclosure without unduly lengthening this specification, applicants incorporate-by-reference the documents and patent disclosures referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

What is claimed is:

1. A mobile device comprising:
   a microphone for capturing ambient audio;
   a global positioning system receiver (GPS receiver) for obtaining location information;
   memory, in which a plurality of different user profiles is associated with different information in said memory, and in which the plurality of different user profiles comprises at least: i) a business profile including information associated with a professional social media service, or ii) a personal profile including information associated with a personal social media service; and
   one or more processors programmed for:
      analyzing captured ambient audio to yield audio information;
      selecting a user profile from among the plurality of different user profiles based on the audio information and on the location information.

2. The mobile device of claim 1 further comprising an accelerometer for indicating relative movement, and in which the selecting is determined at least in part on the relative movement.

3. The mobile device of claim 1 in which the audio information is inferred based on an audio noise level of captured ambient audio.

4. The mobile device of claim 1 in which the audio information is inferred based on signal characteristics of captured ambient audio.

5. The mobile device of claim 1 further comprising a display screen, in which said one or more processors are programmed for selecting—based on a selected user profile—an image or graphic for display on the display screen, the image or graphic being associated with the selected user profile.

6. The mobile device of claim 5 in which said one or more processors are programmed for embedding a digital watermark in a selected image or graphic, the digital watermark comprising a plural-bit payload associated with the selected user profile.

7. A method comprising:
   obtaining data representing ambient audio, the ambient audio having been captured by a mobile device's microphone;
   obtaining location information from a global positioning system receiver (GPS receiver);
   analyzing the data representing ambient audio to yield audio information; and
   selecting a user profile from among a plurality of different user profiles based on the audio information and on the location information, in which the plurality of different user profiles comprises at least: i) a business profile including information associated with a professional social media service, or ii) a personal profile including information associated with a personal social media service.

8. The method of claim 7 further comprising receiving data indicating relative movement from an accelerometer, in which the user profile is selected at least in part on the relative movement.

9. A non-transitory computer-readable medium comprising instructions stored therein to cause one or more processors to perform the method of claim 8.

10. The method of claim 7 in which the audio information is associated with an audio noise level of captured ambient audio.

11. A non-transitory computer-readable medium comprising instructions stored therein to cause one or more processors to perform the method of claim 10.

12. The method of claim 7 in which the audio information is associated with signal characteristics of captured ambient audio.

13. A non-transitory computer-readable medium comprising instructions stored therein to cause one or more processors to perform the method of claim 12.

14. The method of claim 7 further comprising selecting an image or graphic for display on a display screen, the image or graphic being associated with the selected user profile.

15. The method of claim 14 further comprising embedding a digital watermark in the selected image or graphic, the digital watermark comprising a plural-bit payload associated with the selected user profile.

16. A non-transitory computer-readable medium comprising instructions stored therein to cause one or more processors to perform the method of claim 15.

17. A non-transitory computer-readable medium comprising instructions stored therein to cause one or more processors to perform the method of claim 14.

18. A non-transitory computer-readable medium comprising instructions stored therein to cause one or more processors to perform the method of claim 7.

* * * * *